United States Patent [19]
Line

[11] 3,818,879
[45] June 25, 1974

[54] MECHANICAL VALVE LASH ADJUSTER

[75] Inventor: Gerald D. Line, Saginaw, Mich.

[73] Assignee: Eaton Corporation, Cleveland, Ohio

[22] Filed: Apr. 1, 1971

[21] Appl. No.: 130,362

[52] U.S. Cl. .......................... 123/90.54, 123/90.52
[51] Int. Cl. ........... F01l 1/14, F01l 1/20, F01l 1/24
[58] Field of Search....... 123/90, 90.52, 90.54, 90 B

[56] References Cited
UNITED STATES PATENTS

| | | | |
|---|---|---|---|
| 647,020 | 4/1900 | Muller | 123/90.52 |
| 1,531,909 | 3/1925 | Engemann | 123/90.52 |
| 1,543,111 | 6/1925 | Klipstein | 123/90.52 |
| 1,701,599 | 2/1929 | Woolson | 123/90.52 |
| 1,746,802 | 2/1930 | Small | 123/90.52 |
| 2,019,792 | 11/1935 | Nieiman | 123/90.54 |
| 2,667,079 | 1/1954 | Muller | 123/90.52 |
| 3,002,508 | 10/1961 | Barker | 123/90.52 |
| 3,270,726 | 9/1966 | Cotton | 123/90.52 |
| 3,538,895 | 11/1970 | Jensen | 123/90.52 |
| 3,599,613 | 8/1971 | Freese | 123/90.52 |

FOREIGN PATENTS OR APPLICATIONS 730,974 11/1932 France ................................ 123/90

Primary Examiner—Laurence M. Goodridge
Assistant Examiner—Ronald B. Cox
Attorney, Agent, or Firm—Teagno & Toddy

[57] ABSTRACT

A valve gear lash adjuster includes a body having an inclined bore therein and a tapered pin in said bore for defining with said body a pair of parallel, adjustable surfaces.

4 Claims, 4 Drawing Figures

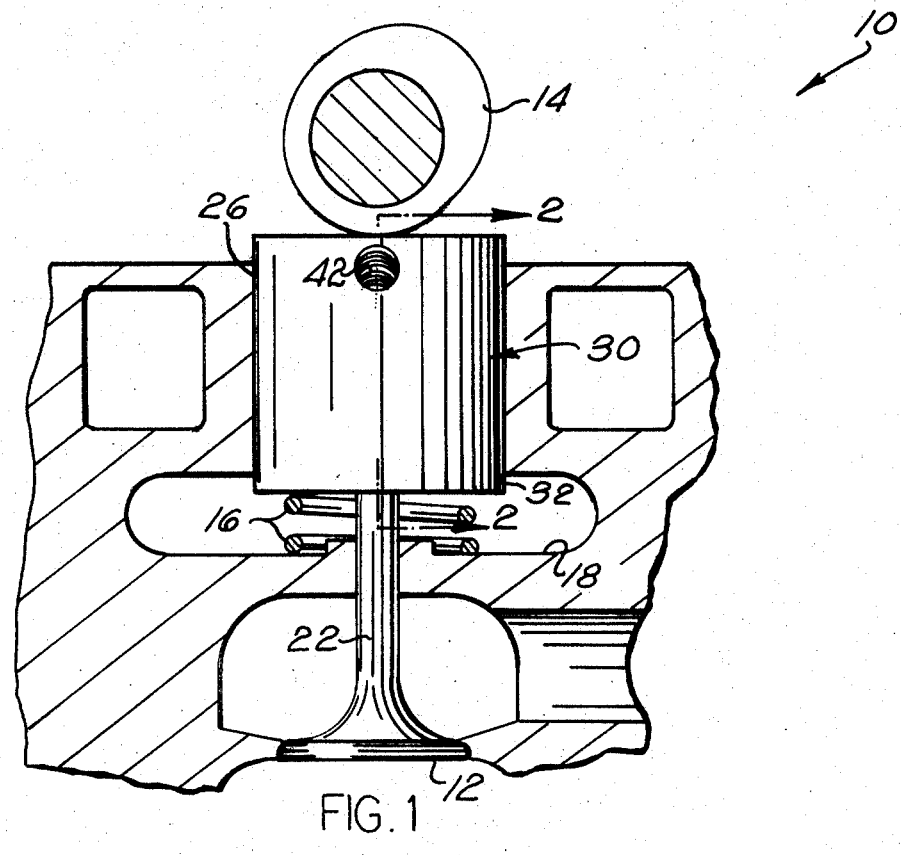
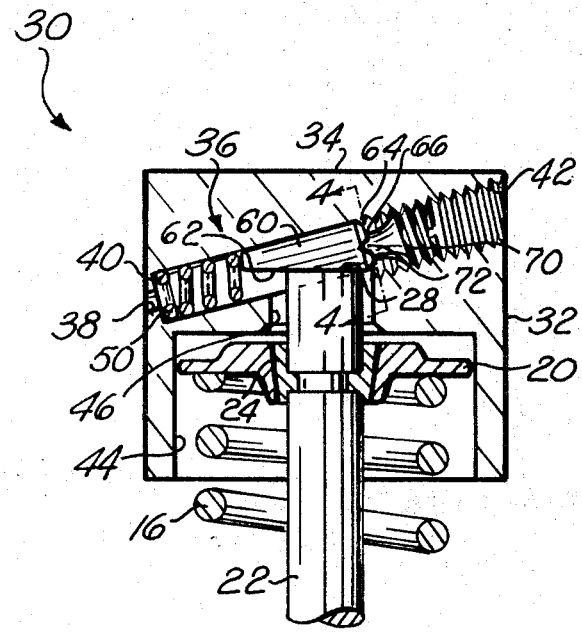
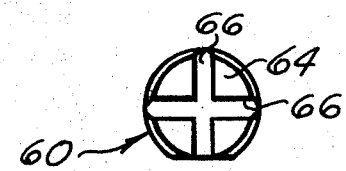
FIG. 1
FIG. 2
FIG. 3
FIG. 4
INVENTOR
GERALD D. LINE
BY Teagno & Toddy
ATTORNEYS

MECHANICAL VALVE LASH ADJUSTER

BACKGROUND OF THE INVENTION

1. Field of the Invention

This invention relates to a manual, mechanical adjuster for adjusting clearance in the valve gear of an internal combustion engine.

2. Discussion of the Prior Art

The prior art known to the applicant is best represented by the following U.S. Pat. Nos.: 3,270,726 and 3,301,239.

U.S. Pat. No. 3,270,726 discloses a valve gear tappet with lash adjustment means, said means comprising a threaded member having a flat surface thereon. The threaded member is located in a threaded bore in the tappet body, said bore being disposed at an angle into the tappet face such that the flat surface on the threaded member may be rotated into a series of positions where the flat is parallel to the tappet face. In the structure of Pat. No. 3,270,726, however, the adjustment for lash in the valve gear requires rotation of the threaded member through 360° in order to make an adjustment.

U.S. Pat. No. 3,301,239 discloses an adjustable valve gear lash adjuster wherein a threaded adjusting element is disposed in a cylindrical tappet body with its axis of rotation concentric with the central axis of the tappet body. One end of the threaded element acts as one face of the tappet. As can be readily seen, however, adjustment of the tappet in 3,301,239 requires that a tool be inserted through openings provided therefor in the cam shaft.

Another patent, U.S. Pat. No. 3,298,333, includes a less relevant structure, an automatic mechanical lash adjuster, but is included by applicant to show the state of the art of lash adjusters in valve gear.

SUMMARY OF THE INVENTION

The invention of the present application is a mechanical tappet for use in the valve gear of an internal combustion engine. The tappet includes a body member having a bore therein, said bore being inclined at an acute angle to the cam face of the tappet. A wedge and driving member therefor are located within said bore. The driving means may include threads for causing movement of the driving means axially of the bore upon rotation thereof relative to the tappet body. The wedge is spring biased into engagement with said driving means, slidably mounted within said bore and includes means for normally resisting rotational movement of the driving means with respect to the bore in the tappet body. The wedge is in the form of a pin having a flat surface thereon with the wedge included angle thereof being the same acute angle as that subtended between the bore and the cam engaging tappet face, whereby the flat surface of the pin may be parallel to the cam engaging tappet face when the pin is disposed in said bore.

BRIEF DESCRIPTION OF THE DRAWING

FIG. 1 is a partial sectional view through an internal combustion engine showing a typical environment for the invention of the present application.

FIG. 2 is a sectional view taken along line 2—2 of FIG. 1 showing the tappet of the present invention.

FIG. 3 is a detail showing of an element shown in FIG. 2.

FIG. 4 is a detail of a portion of the tappet of the present invention taken along line 4—4 of FIG. 2.

DESCRIPTION OF A PREFERRED EMBODIMENT

Referring now to FIG. 1 wherein there is shown a partial sectional view through a portion of an internal combustion engine 10 having a standard poppet type valve 12 which is adapted to be moved by cam 14 to control either the intake or exhaust of gases from a cylinder of the internal combustion engine 10. Biasing the valve 12 toward the closed or upward position is a standard valve spring 16 acting between a surface 18 of the engine (See FIG. 1) and a washer 20 (See FIG. 2) which is maintained in position on a stem 22 of valve 12 by a standard valve keeper 24, all of which is well known in the art. Further, as shown in FIG. 1, the internal combustion engine 10 has a bore 26 for slidably receiving an adjustable mechanical tappet 30 of the preferred embodiment. The tappet 30 is operably positioned intermediate the cam 14 and an end surface 28 of the valve stem 22 for transmitting motion therebetween.

The tappet 30 comprises a generally cylindrical body member 32 having a planar surface 34 disposed for engaging the cam 14, and a stepped bore 36 passing therethrough intersecting the centerline thereof and being disposed at an acute angle relative to the planar surface 34.

The stepped bore 36 comprises a reduced portion 38 at one end thereof, a larger intermediate portion 40 and a still larger threaded portion 42 at the other end thereof.

The end 38 of the stepped bore 36 of tappet 30 is positioned to be disposed adjacent the wall of the bore 26 of the internal combustion engine 10 in which the tappet 30 is received and is thereby enabled to collect lubricating oil therefrom during operation thereof for lubricating the internal portions of the tappet mechanism 30. The reduced portion 30 further serves to ventilate the intermediate portion 40 of the stepped bore to prevent gases from becoming trapped therein during adjustment or operation of the tappet mechanism 30.

The end of body member 32 opposite the cam engaging surface 34 has a large counter bore 44 for providing clearance to receive the end of valve spring 16, washer 20, and end 28 of the valve stem 22.

The body member 32 has a second counter bore or opening 46 in the bottom of counterbore 44 to permit the end 28 of valve stem 22 to extend into the intermediate portion 40 of stepped bore 36 when the tappet mechanism 30 is assembled into an internal combustion engine as shown in FIG. 2.

Disposed within the intermediate portion 40 of stepped bore 36 is a coil spring 50 and a wedge 60 with the wedge 60 being biased to the right as shown in FIG. 2 by the coil spring.

The wedge 60 comprises a generally cylindrical pin member having a flat surface 62 disposed on one side thereof an acute angle relative to the centerline of the cylindrical portion thereof. The acute angle at which this surface is disposed is of the same magnitude as the angle between the stepped bore 36 and the planar surface 34 of the body member 32.

Thus, it can readily be seen that when the wedge member 60 is properly orientated in intermediate portion 40 of bore 36, as shown in FIG. 2, the flat surface 62 of the tappet mechanism 30 will be engaged by the end 28 of valve stem 22 which extends through counterbore 46 when the tappet 30 is mounted in the internal combustion engine 10. Furthermore, adjustment of the distance between these parallel surfaces and consequently adjustment of the valve clearance may readily be accomplished by sliding wedge member 60 longitudinally of the bore 36 without changing the parallelity of these surfaces and rotation of the wedge member 60 will be resisted by engagement of the flat surface 62 with the end 28 of valve stem 22.

The wedge member 60 further includes an end surface 64 having a plurality of radially extending notches 66, the purpose of which will become more readily apparent from the description which follows hereinafter.

Disposed in the threaded portion 42 of stepped bore 36 and engaging the notched end 64 of wedge member 60 is an adjusting screw 70. The adjusting screw 70 has a protrubance or nib 72 extending from the end thereof adjacent wedge member 60 for engaging one of the notches 66 to resist relative rotational movement between these members. This arrangement keeps the the adjusting screw 70 from being backed out of adjustment by excessive axial loads or vibrations which may be encountered during operation of the internal combustion engine 10.

The wedge or pin 60 is shown in FIG. 4 as having been advantageously provided with a crossed pair of the notches 66 to permit a finite adjustment of valve lash or clearance for every quarter turn of the screw 70.

When it has been determined that adjustment of the valve lash or clearance is necessary, a tool or screwdriver (not shown) may be inserted into the threaded portion 42 of stepped bore 36 to turn screw 70. If the screw 70 is rotated in the clockwise direction, the wedge 60 will move to the left against the force of spring 50 to decrease valve clearance. If screw 70 is rotated in the counter clockwise direction, the spring 50 will move wedge 60 to the right thereby increasing valve clearance.

From the foregoing, it should be apparent that the hereinbefore enumerated objects and others have been accomplished and that a new and improved tappet mechanism has been described so as to enable one of ordinary skill in the art to practice the invention of this application.

Although the illustrated embodiment has been described in great detail, it should be apparent that certain modifications, changes and adaptations may be made in the illustrated embodiment and it is hereby intended to cover all such modifications and adaptations which come within the scope of the appended claims.

What is claimed is:
1. A mechanical valve lash adjuster comprising:
a body member having a generally planar face thereon and a bore therein, said bore being located at an acute angle with respect to the plane of said face;
a wedge slidably located within said bore of the body member and having a planar surface thereon, the included angle of said wedge being the same as said acute angle whereby said planar surface may be parallel to said face on said body member and opposite therefrom;
driving means engaging the wedge and cooperating with the body member to selectively position the wedge in said bore with respect to the body member, said driving means including means engaging the wedge for normally resisting rotary movement of the driving means with respect to the wedge, and a spring operatively associated with the body member and the wedge to maintain the wedge in engagement with the driving means.
2. A mechanical lash adjuster as defined in claim 1 wherein said driving means comprises a threaded member engaged by mating threads in the body member and movement of the threaded member is caused by rotation thereof.
3. A mechanical lash adjuster as defined in claim 2 wherein the means normally preventing movement of the threaded member with respect to the wedge comprise;
the threaded member including an axially extending projection; and
the wedge including a groove therein; with said projection and groove cooperating to normally prevent rotation of said threaded member relative to said wedge.
4. A mechanical lash adjuster as defined in claim 3 wherein the wedge comprises a generally cylindrical pin having a tapered surface thereon disposed at an acute angle to the axis of said cylinder and includes a plurality of radially extending grooves in an end surface thereof.

* * * * *